United States Patent

[11] 3,631,566

[72] Inventors Edward H. Dhuysser
Chicago;
Harry P. Eichin, Western Springs, both of Ill.
[21] Appl. No. 881,503
[22] Filed Dec. 2, 1969
[45] Patented Jan. 4, 1972
[73] Assignee Union Carbide Corporation
New York, N.Y.
Original application Feb. 7, 1968, Ser. No. 703,748, now Patent No. 3,507,669, dated Apr. 21, 1970. Divided and this application Dec. 2, 1969, Ser. No. 881,503

[54] APPARATUS FOR PROCESSING A CONTINUOUS TUBING
5 Claims, 7 Drawing Figs.

[52] U.S. Cl. .................................................... 17/42
[51] Int. Cl. .................................................... A22c 13/00
[50] Field of Search ........................................ 17/42

[56] References Cited
UNITED STATES PATENTS
3,209,398  10/1965  Ziolko .......................... 17/42
3,503,093  3/1970  Marbach et al. .............. 17/42

Primary Examiner—Lucie H. Laudenslager
Attorneys—Paul A. Rose and John F. Hohmann ABSTRACT: Apparatus for processing a continuous length of tubing wherein a wet tubing is dried at a low inflating pressure and is shirred at a higher inflating pressure, the drying zone being separated from the shirring zone by gated feed means for the inflated tubing.

INVENTOR.

BY John F. Hohmann

PATENTED JAN 4 1972

INVENTOR.

BY John F. Hohmann

APPARATUS FOR PROCESSING A CONTINUOUS TUBING

This application is a division of our application Ser. No. 703,748, filed Feb. 7, 1968, now U.S. Pat. No. 3,507,669, issued Apr. 21, 1970 for "Method and Apparatus for Processing A Continuous Tubing."

The present invention relates to the production of sausage casings and, more particularly to an improved apparatus for processing a continuous length of extruded porous tubing which is used as a sausage casing.

Edible, natural casings obtained from animal intestines have many obvious disadvantages in present-day highly automated processing steps. Their main disadvantages are that they vary in size and edibility and are somewhat difficult to clean and prepare by mechanical means for human consumption.

To overcome these deficiencies, an artificial, edible casing has recently been developed and is produced from protein sources such as collagen. A very thin-walled casing may be obtained by extruding a collagen mass in the form of a continuous tubing, collapsing the extruded tubing and treating said tubing by passage through a bath. The treated collagen tubing is thereafter inflated, dried, and sized, and then shirred, severed into predetermined lengths and compressed into sticks. These sticks are later placed by the meat packer on a stuffing horn and filled with sausage emulsion. The collagen casings are tender, readily cookable and edible with the sausage emulsion.

However, processing collagen casing is a delicate operation presenting several problems because the freshly treated collagen tubing is very fragile, weak and porous. Because the tubing is porous, the well-known "blown-tube or bubble method" cannot be employed to inflate it and an inflating gas must be continuously supplied. For the same reason, the sizing, drying and shirring operations are usually performed as a continuous process and the inflating gas, i.e., air, is most readily supplied to the tubing from the hollow shirring mandrel which is used in said process. Also, because the wet tubing is fragile, the pressure of the inflating air must be maintained very low.

Inflating a tubing from a hollow mandrel is well known in the art of shirring regenerated cellulose tubing which is inflated in order to impart to the tubing wall the amount of rigidity and stiffness necessary for advancing the tubing over the mandrel and permitting shirring members to grip the advancing tubing and to form pleats therein. The pressure of the inflating air upon the tubing wall is an important factor affecting the character and uniformity of the pleats and the compression of the shirred tubing into a compact casing stick. The form of the pleats is important because the compression factor and the cohesion and integrity of the casing stick largely depend upon it. A tightly compressed shirred stick is necessary for satisfactory handling and shipping of the stick.

A wet extruded collagen tubing is usually inflated to a low gas pressure of up to about 1 inch water column. While this pressure is satisfactory for the sizing and drying steps, it is insufficient for the shirring step. When collagen tubing is shirred at such a low pressure, the resulting stick is limp, nonuniform and noncoherent and thus is a highly unsatisfactory product.

It is an object of the present invention to provide a novel apparatus for processing a continuous length of tubing, which permits drying a tubing at a low inflating gas pressure, and shirring the dried tubing at a higher inflating gas pressure.

Accordingly, the present invention provides a means for processing a continuous length of tubing wherein an advancing tubing is passed from a first zone in which said tubing is inflated at a low pressure into a second zone in which it is inflated at a higher pressure. The sizing and drying steps are carried out in the first zone and the shirring, severing and compressing steps in the second zone.

The present invention provides an apparatus for processing a continuous length of tubing which comprises means for inflating a tubing at the leading end thereof, means for drying the inflated tubing and means for shirring the dried tubing, the means for drying the tubing being separated from the shirring means by gated feed means forming a constricting passage of variable size for the dried inflated tubing, whereby a small regulatable amount of the inflating gas in the tubing is allowed to flow from the tubing in the shirring zone into the tubing in the drying zone to provide in the tubing a predetermined gas pressure differential.

The shirred casing stick produced by the apparatus of this invention is uniformly pleated, rigid, coherent and retains these highly desirable characteristics throughout the various handling steps encountered in the subsequent packing, shipping and stuffing operations.

The invention will now be described with reference to the accompanying drawings, in which, FIG. 1 is a schematic said elevation view of a shirring machine provided with gated feed means in the form of rolls according to one embodiment of the invention;

Figure 1:
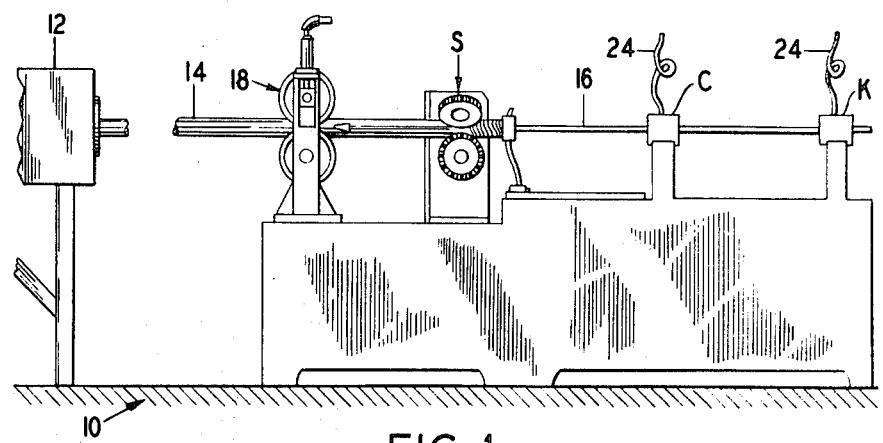

FIG. 1 illustrates a collagen tubing processing apparatus generally indicated as 10. The apparatus 10 comprises a dryer unit 12 where an advancing wet extruded collagen tubing 14 is continuously dried in the inflated state at a preselected low-inflation pressure. A shirring head S such as disclosed in U.S. Pat. Nos. 2,983,949 and 3,115,669 for example, for shirring an inflated casing is disposed in the path of the continuously advancing dried, inflated tubing 14. The dried tubing 14 is fed onto a hollow shirring mandrel 16 by gated feed means generally shown as 18, in such a manner that the mandrel is axially and centrally disposed within the tubing. The mandrel 16 is maintained in a fixed position central to the shirring means S by alternately activated, removable clamp C and K. An inflating gas, preferably air, for the tubing 14 is fed through the mandrel bore 20 (FIG. 2) to the mandrel tip 22 from a regulated pressure air supply source (not shown). The mandrel tip 22 is positioned between the feed means 18 and the shirring head S. Flexible conduits 24 from the air supply source are suitably connected to mandrel clamps C and K, thence to mating ports leading into the mandrel bore 20. Through mandrel tip 22 inflating air is continuously supplied to the tubing and flows from the tubing entering the zone of shirring to the tubing in the zone of drying. In one embodiment of the invention, illustrated in FIGS. 2 and 3, the feed means include a pair of coacting resilient feed rolls comprising drive roll 26 and idler roll 28 urged into a cooperating pressurised nip 30 by pneumatic pressure means 32 and conventional linkage. Feed rolls 26 and 28 are respectively provided on their resilient peripheral surface with mating annular grooves 34 and 36 which form at the pressurized nip 30 a gate or constricting passage 38 for the inflated tubing 14. The constricted tubing at the nip 30 is thus forced to define a narrow passage for the inflating air contained therein and flowing through mandrel tip 22 into tubing 14 in the zone of shirring and, from there into tubing 14 in the zone of drying. The amount of air, and therefore the inflating pressure in the latter zone is easily regulated. It depends on the size of the passage 38 which may be varied at will by the action of the pneumatic pressure means 32 upon the resilient surface of rolls 26 and 28. The passage 38 thus provides a variable size gate to create and maintain within the inflated tubing a predetermined pressure differential.

In the processing of collagen tubing, the inflating pressure for the tubing in the drying zone is usually no greater than about 1 inch water column, while the inflating pressure for the tubing in the shirring zone may be as high as up to about 135 inches water column. The pressure differential may be within the range of from about 135:1 to about 20:1 with a preferred range of from about 80:1 to about 40:1. The inflating pressure, however, depends on the speed of the continuously advancing tubing. For example, at a tubing speed of 15 feet per minute, if the tubing inflating pressure in the drying zone is, for example, about 1 inch water column, the pressure in the shirring zone may be 80 inches water column, i.e., a pressure differential of 80:1. If the casing speed is doubled to 30 feet per minute, the inflating pressure will preferably be about 2 inches water column in the drying zone, while it may remain at 80 inches water column in the zone of shirring, thus, the pressure differential becomes 40:1.

Figure 2:
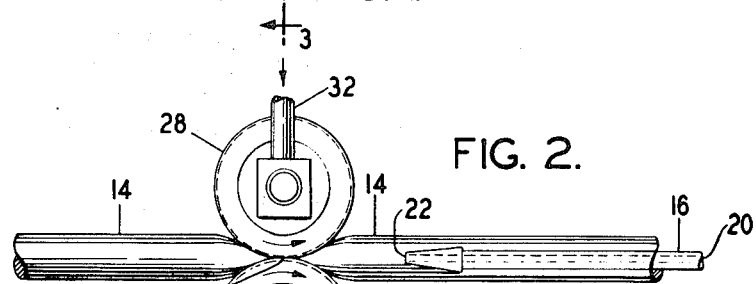
FIG. 2 is an enlarged schematic side elevation view of the gated feed rolls and of a fragmentary portion of the mandrel shown in FIG. 1.
Figure 3:
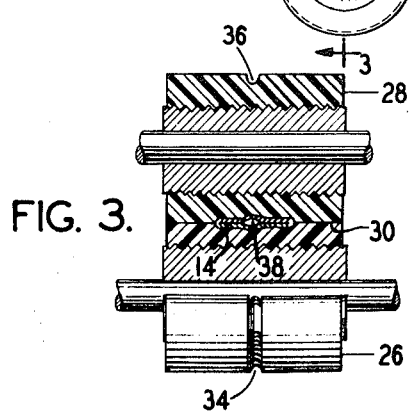
FIG. 3 is a horizontal cross section taken along line 3—3 of FIG. 2.
Figure 4:
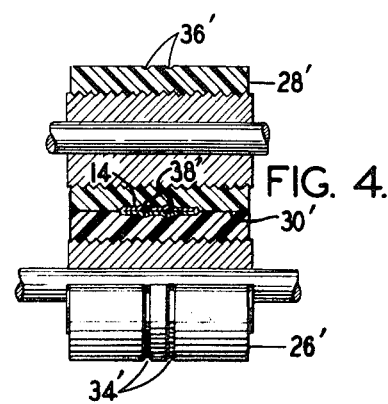
FIG. 4 is a horizontal cross section similar to FIG. 3 but showing an alternate embodiment of the gated feed rolls shown in FIG. 2.

FIG. 4 illustrates another embodiment of the resilient feed rolls of FIGS. 2 and 3, in which drive roll 26' and idler roll 28' are each provided on their resilient peripheral surface with a plurality of annular grooves 34' and 36' which mate at pressurized nip 30' to form a corresponding number of gates or constriction passages 38' for the inflated tubing 14. As in the preceding embodiment, a small, predetermined amount of inflating air flows through the gates 38' into the zone of drying.

Figure 5:
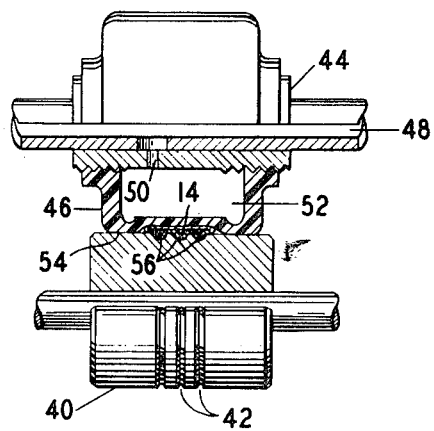
FIG. 5 is a horizontal cross section similar to FIG. 3 but showing another alternate embodiment of the gated feed rolls shown in FIG. 2.

FIG. 5 illustrates a further embodiment of the gated feed means of the invention, which comprises a nonresilient drive roll 40 provided with a plurality of annular grooves 42 on the peripheral surface thereof. Drive roll 40 cooperates with idler feed roll 44 provided with a resilient cylindrical sleeve 46 which is inflated with a fluid, preferably air. Air under regulated pressure is fed through hollow shaft 48 of feed roll 44, to roll ports 50 and thence into a chamber 52 of sleeve 46. Under the pressure of the air in the chamber 52, the sleeve 46 forms with the roll 40 a pressurized nip 54 for the inflated tubing 14, a portion of the tubing wall in contact with the roll 40 is forced into the grooves 42 and thus the constricted tubing defines a plurality of narrow passages 56 for the inflating air which flows from the zone of shirring to the zone of drying. The depth of penetration of the tubing wall into the grooves 42 is determined by the amount of pressure in the chamber 52. By appropriate sensing means (not shown) and modulating control of the air pressure in the chamber 52, the size of the passages 56 may be closely regulated to permit the establishment of any desired pressure differential in the tubing between the zone of shirring and the zone of drying. Alternately, the drive roll 40 could be provided with a single annular groove on its peripheral surface.

It is easier to control the inflating pressure in larger size tubing than in smaller size tubing. While the above-described embodiments have been found satisfactory in the processing of tubing of various sizes, the embodiments illustrated in FIGS. 4 and 5 are preferred because it is easier to obtain a more accurate control of the flow of inflating air when the gated feed rolls are provided with a plurality of small grooves, rather than with a single large groove. The spaced, narrow passages defined by the thus constricted tubing form more precise means for regulating the pressure differential without requiring a high-nip pressure on the wall of the tubing. Also, since the flexible sleeve 46 of FIG. 5 conforms with the shape of the casing, it makes the control of the pressure even easier and thus renders this latter embodiment more suitable for processing medium or smaller size tubing. A further advantage of the grooves is to improve the accuracy of the feed rolls in leading the tubing onto the mandrel.

Figure 6:
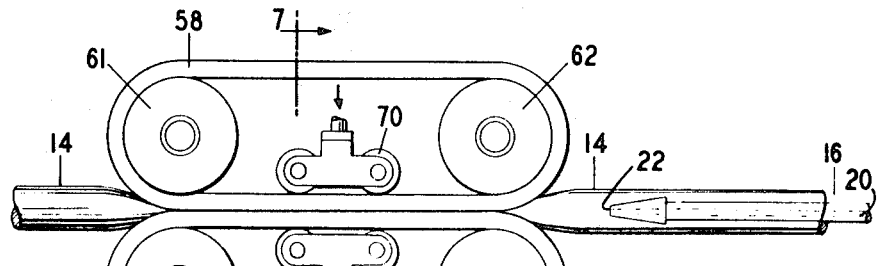
FIG. 6 is an enlarged schematic side elevation view of another embodiment of the gated feed means of the invention, in the form of belts.
Figure 7:
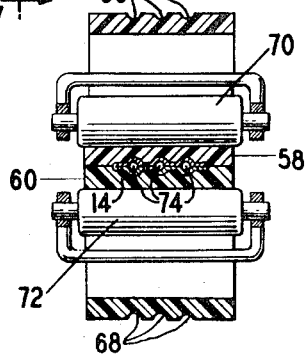
FIG. 7 is a horizontal cross section of the gated feed belts taken along line 7—7 of FIG. 6.

In still another embodiment illustrated in FIGS. 6 and 7, the gated feed means of this invention include a pair of coacting endless, resilient feed belts 58 and 60 supported on pulleys or wheels 61, 62, 63 and 64. The outside surface of each belt is provided with one or more longitudinal grooves 66 and 68 which are urged into pressing engagement with the tubing passing between the belts by opposing force means such as two pairs of idler rolls 70 and 72 respectively disposed in pressure contact with the inside surface of the belts 58 and 60 between each set of wheels 61, 62 and 63, 64. The feed belts 58 and 60 flatten and advance the inflated tubing 14 from the dryer 12 to the shirring head S. As described above, inflating air is supplied to the tubing 14 through the bore 20 and the tip 22 of the mandrel 16 to provide an inflating pressure of preferably about 70 to 80 inches water column in said tubing in the zone of shirring. The grooves on the surface of the belts 58 and 60 form an elongated constricting passage for the tubing and force said tubing to define a narrow, elongated passage 74 for the air contained therein and flowing from the zone of shirring into the zone of drying as above described. The size of the passage 74, and therefore the amount of air flowing therethrough is regulated by tubing pressure sensing means (not shown) disposed in the drying zone and cooperating with the idler rolls 70 and 72. The inflating pressure of the tubing in the dryer 12 is thus maintained at preferably about 1 inch or 2 inches water column, depending on the speed of the advancing tubing, as above explained. The gated feed belts of this last embodiment are preferred in the processing of small-size tubing.

The resilient material employed in the construction of the feed rolls and feed belts of the invention is not critical. It may, for example, be rubber, either natural or synthetic, a rubber impregnated fabric.

Thus, the apparatus of the present invention provides very simple, efficient means of continuously and automatically producing, from an inflated collagen tubing, shirred compressed collagen sticks of substantially uniform diameter, regularly pleated, having an excellent cohesion, and which are ideally suited for subsequent shipping, stuffing, linking and cooking as sausage products.

While the invention has been described in detail with respect to the processing of a continuous length of collagen tubing, it will be understood that it is not limited thereto, and modifications and changes apparent to those skilled in the art may be made without departing from the spirit and scope of the invention. For example, it may be used in processing other kinds of tubings which are also porous and weak in the wet state, such as tubings made from alginate, or polyvinyl acetate, or cellulosic derivatives such as cellulose acetate, which have thin, weak walls with pore forming areas. Also, the grooves in the feed rolls and belts may be replaced with raised portions projecting from the surface of the rolls and belts, for example.

What is claimed is:

1. An apparatus for processing a continuous length of tubing, which comprises a dryer for drying a continuous length of wet tubing, gated feed means for feeding the dried tubing to a hollow shirring mandrel extending axially within said tubing, means for shirring said tubing on the mandrel, and means for admitting a gas under pressure into the interior of the hollow mandrel, said gated feed means forming a constricting passage for regulating the flow of gas to said tubing the tubing feed end of said mandrel being positioned between the gated feed means and the shirring means and having a gas outlet opening therein.

2. The apparatus of claim 1, wherein the gated feed means comprise a pair of resilient feed rolls respectively provided with an annular groove on their peripheral surface, said annular grooves mating and forming said constricting passage, annular grooves mating and forming for the inflated tubing a passage of a smaller cross section than that of said tubing.

3. The apparatus of claim 2 wherein the peripheral surface of each feed roll is provided with a plurality of annular grooves.

4. The apparatus of claim 1, wherein the gated feed means comprise a nonresilient roll provided with at least one annular groove on the peripheral surface thereof and cooperating with a roll supporting a resilient cylindrical sleeve mounted thereon, the resilient sleeve and the annular groove on the nonresilient roll forming said constricting passage.

5. The apparatus of claim 1, wherein the gated feed means comprise a pair of resilient, endless belts, the outside surface of each belt provided with at least one longitudinal groove, the grooves mating and forming said constricting passage.

PO-1050
(5/69)

UNITED STATES PATENT OFFICE
CERTIFICATE OF CORRECTION

Patent No. 3,631,566      Dated January 4, 1972

Inventor(s) E.H. Dhuysser & H.P. Eichin

It is certified that error appears in the above-identified patent and that said Letters Patent are hereby corrected as shown below:

Column 4 line 60 (claim 2) change the comma to a period and delete the remainder of the line and lines 61 and 62 in their entirety.

Signed and sealed this 2nd day of May 1972.

(SEAL)
Attest:

EDWARD M. FLETCHER, JR.      ROBERT GOTTSCHALK
Attesting Officer      Commissioner of Patents